United States Patent
Kurian et al.

(10) Patent No.: US 10,783,052 B2
(45) Date of Patent: Sep. 22, 2020

(54) DATA PROCESSING SYSTEM WITH MACHINE LEARNING ENGINE TO PROVIDE DYNAMIC DATA TRANSMISSION CONTROL FUNCTIONS

(71) Applicant: Bank of America Corporation, Charlotte, NC (US)

(72) Inventors: Manu Kurian, Dallas, TX (US); Floyd F. Rock, Jr., Chesterfield, VA (US); Saritha Prasad Vrittamani, Plano, TX (US); Patrick Nicholas Lawrence, Plano, TX (US); Paul Grayson Roscoe, Treuddyn Flintshire (GB)

(73) Assignee: Bank of America Corporation, Charlotte, NC (US)

(*) Notice: Subject to any disclaimer, the term of this patent is extended or adjusted under 35 U.S.C. 154(b) by 211 days.

(21) Appl. No.: 15/679,514

(22) Filed: Aug. 17, 2017

(65) Prior Publication Data
US 2019/0057010 A1    Feb. 21, 2019

(51) Int. Cl.
| | | |
|---|---|---|
| *G06G 7/48* | (2006.01) | |
| *G06F 11/34* | (2006.01) | |
| *G06F 8/41* | (2018.01) | |
| *G06F 11/00* | (2006.01) | |
| *G06F 11/36* | (2006.01) | |
| *G06F 8/38* | (2018.01) | |

(52) U.S. Cl.
CPC ........ *G06F 11/3457* (2013.01); *G06F 8/4441* (2013.01); *G06F 11/3428* (2013.01); *G06F 11/3495* (2013.01); *G06F 8/38* (2013.01); *G06F 11/006* (2013.01); *G06F 11/366* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 6,012,152 A | 1/2000 | Douik et al. | |
| 6,088,804 A * | 7/2000 | Hill | G06F 21/552 726/25 |
| 6,115,393 A | 9/2000 | Engel et al. | |

(Continued)

*Primary Examiner* — Rehana Perveen
*Assistant Examiner* — Nithya J. Moll
(74) *Attorney, Agent, or Firm* — Banner & Witcoff, Ltd.; Michael A. Springs

(57) ABSTRACT

Systems for dynamically controlling data transmissions are provided. In some examples, a system may receive data from one or more computer systems. Data associated with an event may be extracted and the extracted data may be compared to one or more machine learning datasets to determine a likelihood that an issue associated with a computer system may occur. The system may determine whether the likelihood is greater than a predetermined threshold. If so, a modification to avoid the potential issue or mitigate an impact may be identified. The modification may be transmitted to and executed by the computer system to modify one or more aspects of the computer system. In some examples, one or more efficiency modifications may be identified based on the comparison of the extracted data to the machine learning datasets. The identified efficiency modification may be transmitted to and executed by the computer system to modify one or more aspects of the computer system.

16 Claims, 11 Drawing Sheets

(56) References Cited

U.S. PATENT DOCUMENTS

| | | | |
|---|---|---|---|
| 6,192,354 B1 * | 2/2001 | Bigus | G06N 5/043 |
| | | | 706/46 |
| 6,286,052 B1 | 9/2001 | McCloghrie et al. | |
| 6,550,057 B1 | 4/2003 | Bowman-Amuah | |
| 7,035,809 B2 | 4/2006 | Miller et al. | |
| 7,181,438 B1 | 2/2007 | Szabo | |
| 7,272,613 B2 | 9/2007 | Sim et al. | |
| 8,810,392 B1 | 8/2014 | Teller et al. | |
| 2004/0153172 A1 * | 8/2004 | Rousseau | G05B 19/058 |
| | | | 700/26 |
| 2012/0023041 A1 * | 1/2012 | Kariv | G06F 11/3447 |
| | | | 706/12 |
| 2013/0031037 A1 | 1/2013 | Brandt et al. | |

* cited by examiner

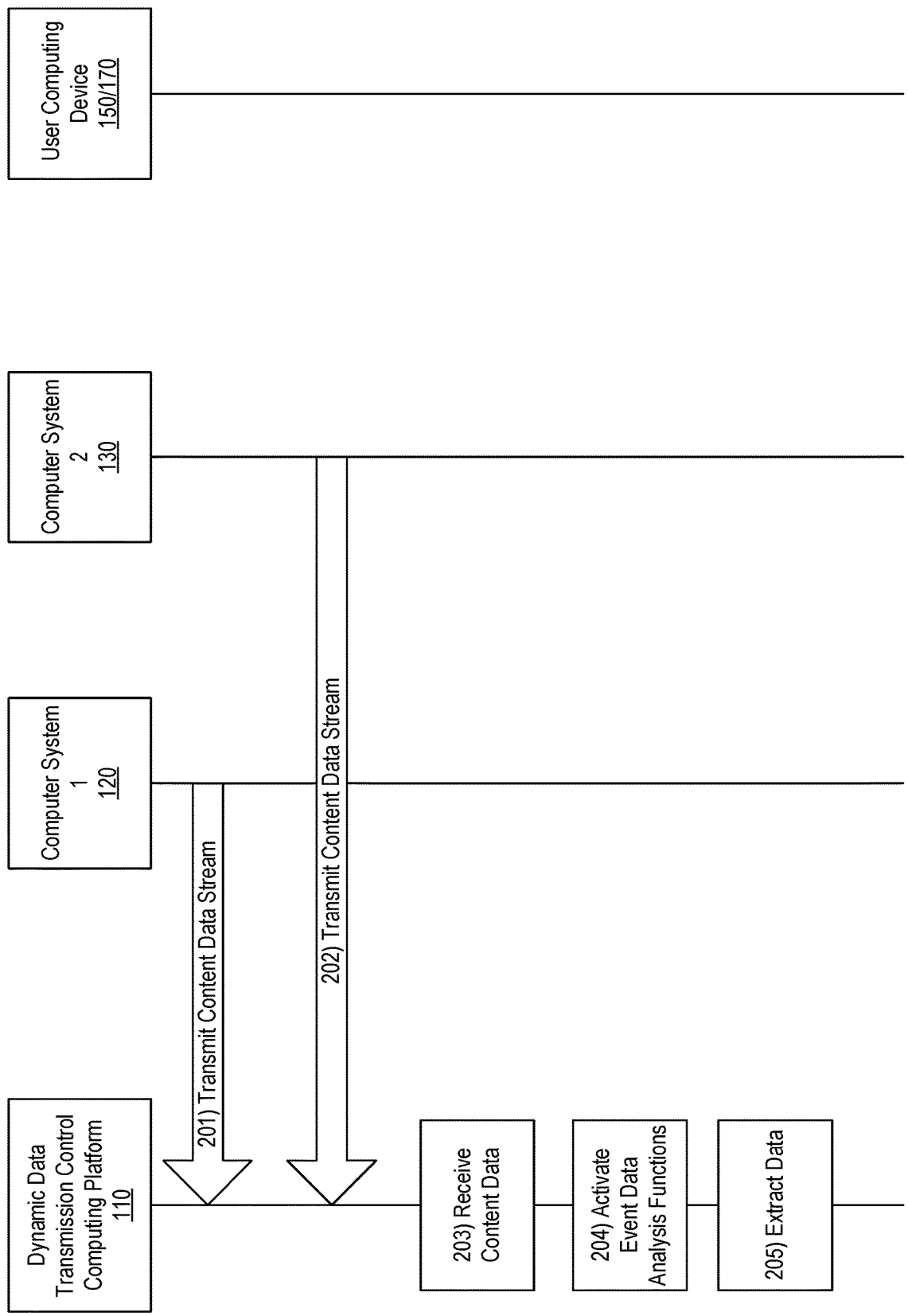

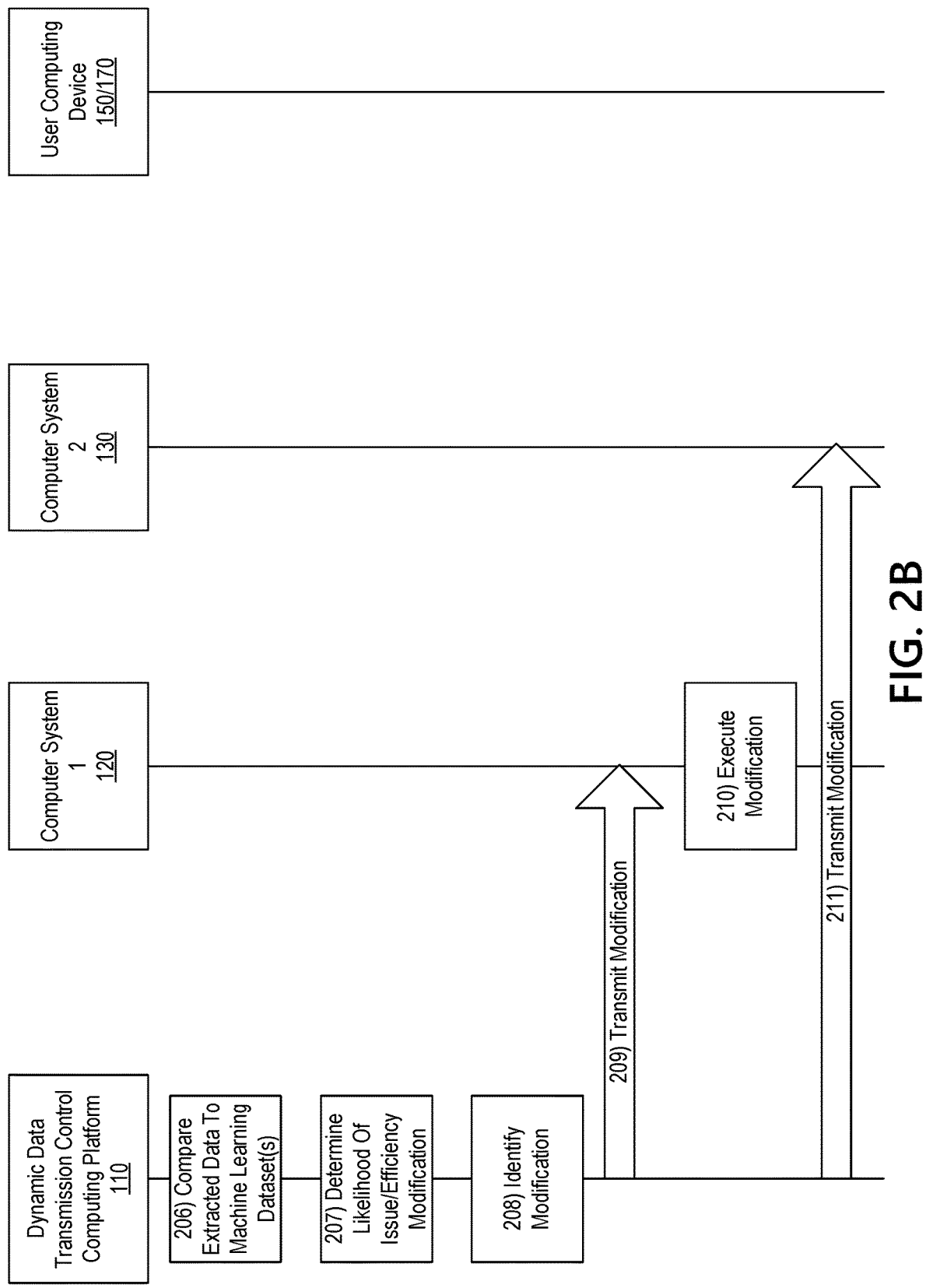

DATA PROCESSING SYSTEM WITH MACHINE LEARNING ENGINE TO PROVIDE DYNAMIC DATA TRANSMISSION CONTROL FUNCTIONS

BACKGROUND

Aspects of the disclosure relate to electrical computers, systems, and machine learning. In particular, one or more aspects of the disclosure relate to implementing dynamic data transmission control functions.

Many entities process a variety of events as part of the day-to-day business of the entity. In some entities, processing these events may be critical to the entity. Accordingly, identifying potential issues in processing the events, as well as identifying modifications to reduce or mitigate impact of the potential issue, may be advantageous. In addition, evaluating requested events to identify efficiency improvements that may reduce computing resources needed to process events, and the like, may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with processing events, identifying potential technical issues with one or more computer systems associated with processing the events, identifying modifications to the system to avoid the potential issue or mitigate the impact, identify resource efficiency improvements, and the like.

In some examples, a system, computing platform, or the like, may receive data, such as a content data stream, from one or more computer systems. In some examples, data associated with an event may be extracted from the received data. For instance, data associated with a file or data transfer request, data storage, and the like, may be extracted.

In at least some examples, the extracted data may be compared to one or more machine learning datasets to determine a likelihood that a potential issue associated with the event or the computer system associated with the event may occur. In some arrangements, the system may determine whether the likelihood of the event is greater than a predetermined threshold. If so, a modification to avoid the potential issue or mitigate an impact of the issue may be identified. The modification may be transmitted to the computer system and may be executed by the computer system to modify one or more aspects of the computer system.

In some examples, one or more efficiency modifications or improvements may be identified based on the comparison of the extracted data to the one or more machine learning datasets. The identified efficiency modification may be transmitted to a computer system and executed by the computer system to modify one or more aspects of the computer system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing dynamic data transmission control functions in accordance with one or more aspects described herein;

DETAILED DESCRIPTION

Figure 1A:
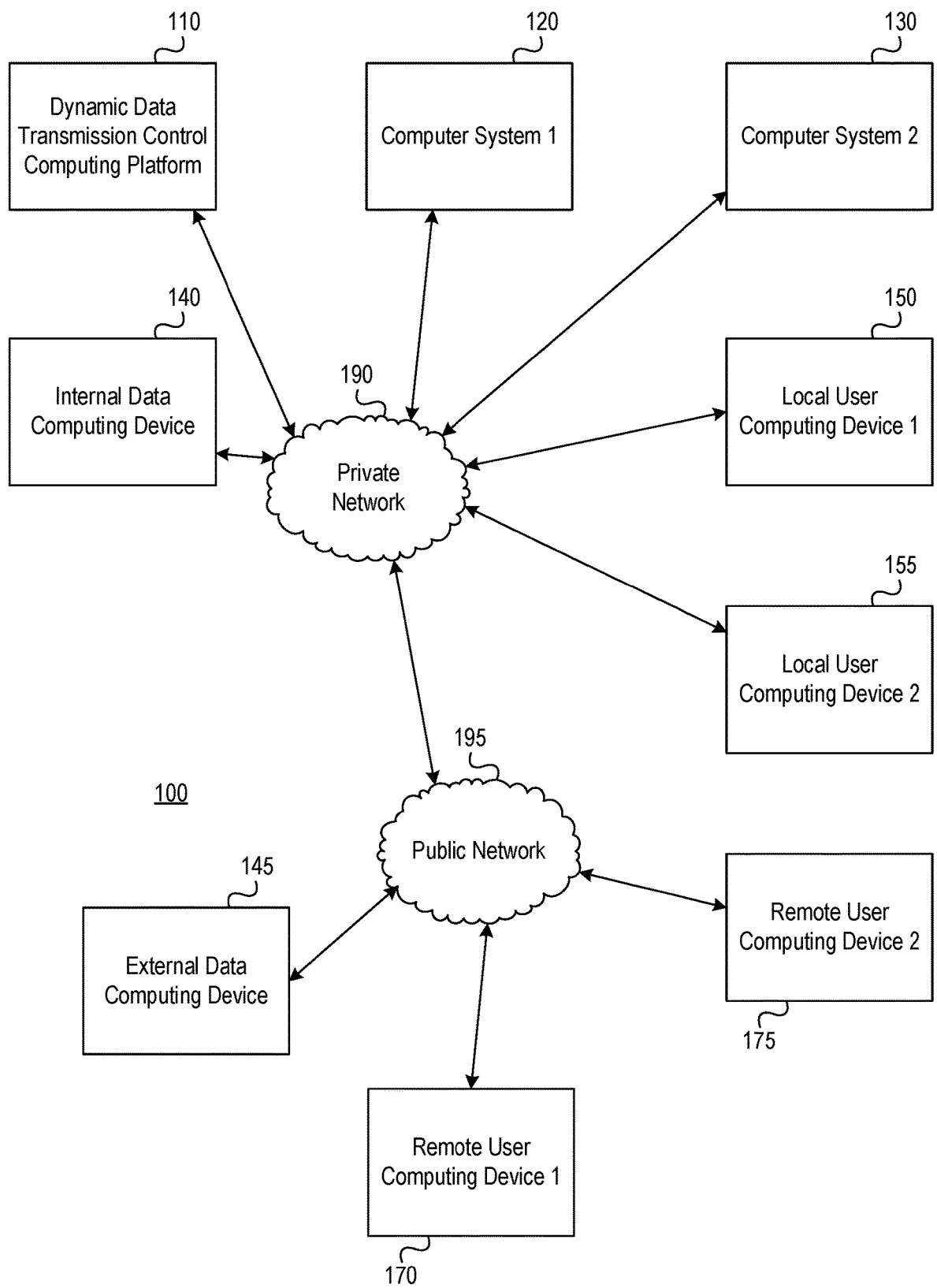
FIGS. 1A and 1B depict an illustrative computing environment for implementing dynamic data transmission control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to determine a likelihood of one or more potential issues associated with an event or computer system, identify a modification to avoid the issue or mitigate an impact of the issue, identify efficiency improvements, and the like.

For many entities, processing events, ensuring continued efficient operation of one or more computer systems, and the like, are important factors for efficient overall operation of the entity. At times, requested events might not be processed as expected because of one or more issues with a computer system, the event request, event data, or the like. Predicting a likelihood of these issues occurring, generating and executing modifications to avoid issues or mitigate impact of issues, and the like, may be advantageous. In addition, predicting efficiency improvements and modifications to one or more computer systems to implement the efficiency improvements or modifications can result in more efficient use of computing resources, faster processing of events, and the like.

Accordingly, aspects described herein provide for dynamic data transmission control functions. In some examples, data may be received from one or more computer systems and in-line data analysis (e.g., real-time data analysis) may be performed to extract data associated with one or more events. In some examples, events may include file or data transfers, data storage, transactions, network bandwidth management, account management, and the like.

In some examples, one or more machine learning datasets may be used evaluate the extracted data to determine a likelihood of an issue occurring with the event, processing the event, the computing resources associated with the event, and the like. In some examples, a modification to one or more computer systems may be identified to avoid the issue or mitigate impact of the issue. In some arrangements, the modification may be executed automatically by the computer system (e.g., without any user input or additional user input).

In some arrangements, one or more machine learning sets may be used to identify one or more efficiency modifications or improvements that may provide for more efficient use of computing resources to process an event. In some examples, the identified efficiency modification or improvement may be automatically executed by the computer system (e.g., without any user input or additional user input).

These and various other arrangements will be discussed more fully below.

Figure 1B:
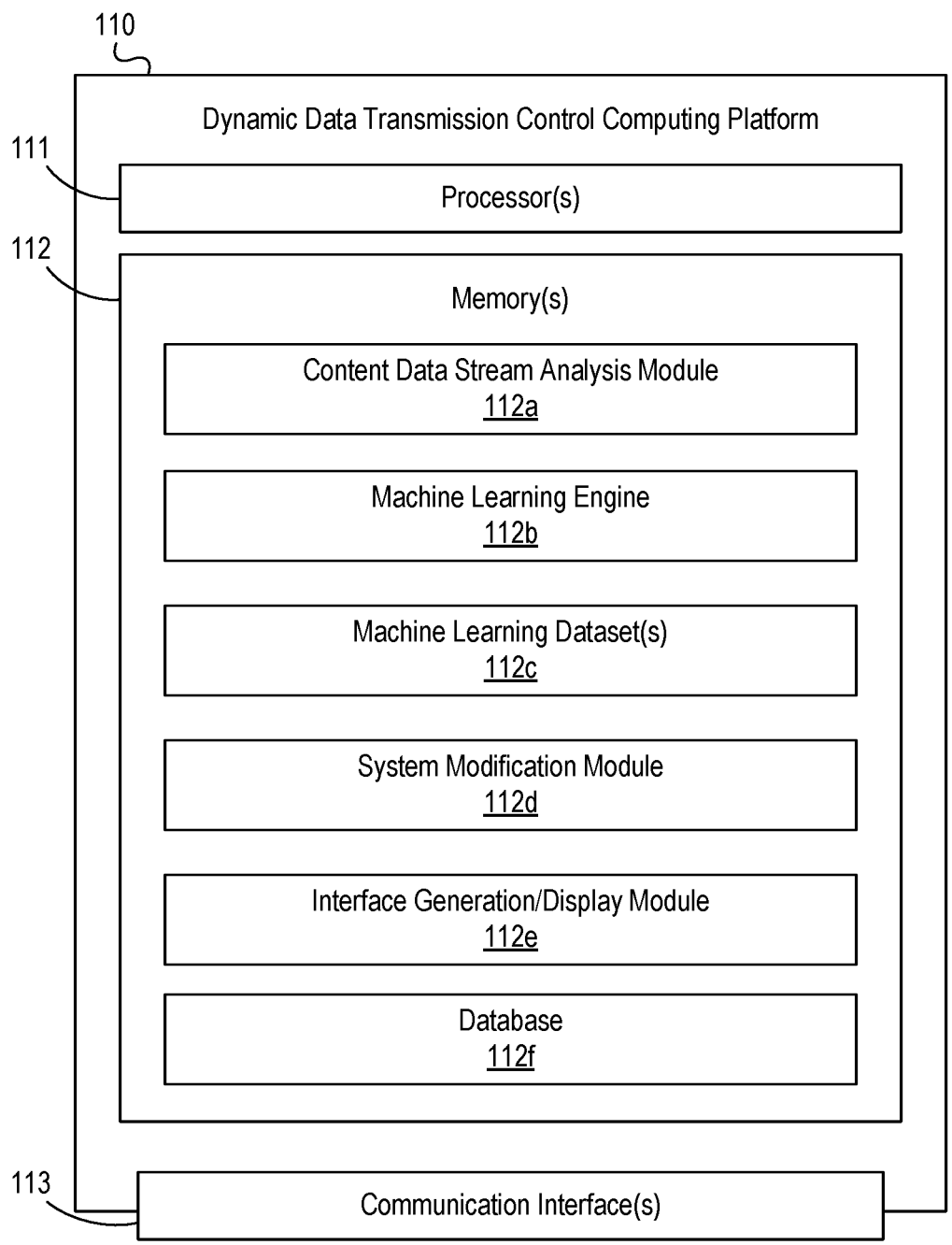

FIGS. 1A and 1B depict an illustrative computing environment for implementing and using a dynamic data transmission control computing system in accordance with one or more aspects described herein. Referring to FIG. 1A, computing environment 100 may include one or more computing devices and/or other computing systems. For example, computing environment 100 may include a dynamic data transmission control computing platform 110, a first computing system 120, a second computing system 130, an internal data computing device 140, an external data computing device 145, a first local user computing device 150, a second local user computing device 155, a first remote user computing device 170, and a second remote user computing device 175.

Dynamic data transmission control computing platform 110 may be configured to host and/or execute a machine learning engine to provide dynamic data transmission control functions. In some examples, one or more content data streams may be received from one or more computer systems, such as computer system 1 120, computer system 2 130, or the like. The data may be analyzed in real-time to determine a likelihood that an issue or potential issue may occur and/or identify an efficiency improvement or modification that may result in more efficient use of computing resources. In some examples, the likelihood and/or improvement may be based on one or more machine learning datasets. In some arrangements, one or more modifications may be transmitted to the one or more computing systems 120, 130 and an instruction to implement the modifications may be executed by the computer systems 120, 130. For instance, modifications to a data structure, database, database design, may be executed to accommodate incoming data, modifications to transfers of data may be executed to improve efficiency or cost effectiveness of data transfer, and the like.

Computer system 1 120 and/or computer system 2 130 may be any type of computer system performing various functions, for example, within an entity. For instance, computer system 1 120 and/or computer system 2 130 may be one or more data storage and processing systems, one or more transaction processing systems, one or more data transfer systems, and the like. In some examples, a content data stream may be received from one or more of computer system 1 120 and/or computer system 2 130 including data that may be analyzed and/or processed by the dynamic data transmission control computing platform 110. Computer system 1 120 and/or computer system 2 130 may also be configured to execute one or more instructions received from dynamic data transmission control computing platform 110 to modify one or more aspect of computer system 1 120 and/or computer system 2 130 in order to avoid an identified potential issue or mitigate an impact of the identified potential issue.

Internal data computing device 140 may be configured to store, transmit, and/or receive data associated with one or more internal data or computer systems. For instance, an entity implementing the dynamic data transmission control computing platform 110 may store data associated with various users, historical transaction data, and the like. This information may be transmitted, via the internal data computing device 140, to the dynamic data transmission control computing platform 110 and may be used to generate one or more machine learning datasets, determine a likelihood of an issue, and the like.

External data computing device 145 may be configured to store, transmit, and/or receive data associated with one or more data or computer systems external to the entity implementing the dynamic data transmission control computing platform 110. For instance, data, such as publicly available data, transaction data, user demographic data, and the like, may be transmitted, via the external data computing device 145, from one or more data or computer systems, to the dynamic data transmission control computing platform 110 and may be used to generate one or more machine learning datasets, determine a likelihood of an issue, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. The local and remote user computing devices may be used to communicate with, for example, dynamic data transmission control computing platform 110, receive and display notifications, modify one or more settings associated with dynamic data transmission control computing platform 110, and the like.

In one or more arrangements, computer system 1 120, computer system 2 130, internal data computing device 140, external data computing device 145, local user computing device 150, local user computing device 155, remote user computing device 170, and/or remote user computing device 175 may be any type of computing device or combination of devices capable of performing the particular functions described herein. For example, computer system 1 120, computer system 2 130, internal data computing device 140, external data computing device 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of computer system 1 120, computer system 2 130, internal data computing device 140, external data computing device 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic data transmission control computing platform 110. As illustrated in greater detail below, dynamic data transmission control computing platform 110 may include one or more computing devices configured to perform one or more of the functions described herein. For example, dynamic data transmission control computing platform 110 may include one or more computers (e.g., laptop computers, desktop computers, servers, server blades, or the like).

As mentioned above, computing environment 100 also may include one or more networks, which may interconnect one or more of dynamic data transmission control computing platform 110, computer system 1 120, computer system 2 130, internal data computing device 140, external data computing device 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic data transmission control computing platform 110, computer system 1 120, computer system 2 130, internal data computing device 140, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic data transmission control computing platform 110, computer system 1 120, computer system 2 130, internal data computing device 140, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic data transmission control computing platform 110, computer system 1 120, computer system 2 130, internal data computing device 140, local user computing device 150, local user computing device 155) with one or more networks and/or computing devices that are not associated with the organization. For example external data computing device 145, remote user computing device 170, and/or remote user computing device 175 might not be associated with an organization that operates private network 190 (e.g., because external data computing device 145, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing device 145, remote user computing device 170 and remote user computing device 175 to private network 190 and/or one or more computing devices connected thereto (e.g., dynamic data transmission control computing platform 110, computer system 1 120, computer system 2 130, internal data computing device 140, local user computing device 150, local user computing device 155).

Referring to FIG. 1B, dynamic data transmission control computing platform 110 may include one or more processors 111, memory 112, and communication interface 113. A data bus may interconnect processor(s) 111, memory 112, and communication interface 113. Communication interface 113 may be a network interface configured to support communication between dynamic data transmission control computing platform 110 and one or more networks (e.g., private network 190, public network 195, or the like). Memory 112 may include one or more program modules having instructions that when executed by processor(s) 111 cause dynamic data transmission control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic data transmission control computing platform 110 and/or by different computing devices that may form and/or otherwise make up dynamic data transmission control computing platform 110.

For example, memory 112 may have, store, and/or include a content data stream analysis module 112a. Content data stream analysis module 112a may store instructions and/or data that may cause or enable the dynamic data transmission control computing platform 110 to receive one or more content data streams from one or more computer systems (e.g., computer system 1 120, computer system 2 130, or the like). The content data streams may include transaction data, data received for storage, file or other data transfer data, and the like. In some examples, the content data stream may include other types of data.

The content data stream analysis module 112a may receive data (e.g., from one or more systems 120, 130) and may extract data associated with one or more events. In some examples, events may include transactions, file transfers, data sets for storage, and the like. The extracted data may include time data, date data, file size data, amount data, type of content data, and the like. This information may be compared to one or more machine learning datasets to determine a likelihood of an issue occurring and/or identify one more efficiency improvement modifications, as will be discussed more fully herein.

In some examples, content data stream analysis module 112a may also receive data from additional computing devices, such as internal computing device 140, external computing device 145, and the like. Data may be extracted from the received data and used in the analysis of the data to determine a likelihood of an issue and/or one or more efficiency modifications.

As mentioned above, the dynamic data transmission control computing platform 110 may further have, store, and/or include a machine learning engine 112*b* and machine learning datasets 112*c*. Machine learning engine 112*b* and machine learning datasets 112*c* may store instructions and/or data that cause or enable dynamic data transmission control computing platform 110 to evaluate extracted content data to determine a likelihood that a potential issue may occur and/or identify one or more efficiently improvements for modifications, and the like. The machine learning datasets 112*c* may be generated based on analyzed data (e.g., data from previously received content data streams, data from internal data computing device 140, data from external data computing device 145, and the like), raw data, and/or received from one or more outside sources.

The machine learning engine 112*b* may receive data (e.g., data from computer system 1 120, computer system 2 130, internal data computing device 140, external data computing device 145, and the like) and, using one or more machine learning algorithms, may generate one or more machine learning datasets 112*c*. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112*b* may analyze data to identify patterns of activity, sequences of activity, and the like, to generate one or more machine learning datasets 112*c*.

The machine learning datasets 112*c* may include machine learning data linking one or more types of data, file sizes, types of transactions, transaction amounts, or the like (or combinations thereof) to a likelihood of an issue occurring and/or one or more efficiency modifications or improvements. For instance, data from previous events (e.g., file transfers, data storage, transactions, and the like), as well as internal data from internal data computing device 140, and/or external data from external data computing device 145, may be used to generate one or more machine learning datasets 112*c* linking data from events to a likelihood of an issue arising (e.g., based on historical data indicating an issue associated with an event) and/or to one or more efficiency improvements or modifications (e.g., based on historical data indicating alternates for performing a function). In instances in which a potential issue is identified (e.g., a likelihood of an issue occurring is above a predetermined threshold) the one or more machine learning datasets 112*c* may indicate a proposed or recommended modification to avoid the potential issue and/or mitigate an impact associated with the issue.

For example, data from previous file transfers may be used to generate one or more machine learning datasets linking file transfer sizes, computer resources involved in a file transfer, date information, time information, and the like, to historical occurrences of issues (e.g., failed file transfers, delayed file transfers, and the like). This information may then be used to determine a likelihood of an issue (e.g., delay, failure, or the like) occurring for data extracted from one or more content data streams and being analyzed (e.g., by content data analysis module 112*a*). In some examples, if the determined likelihood is greater than a predetermined threshold, one or more modifications may be identified to avoid the issue and/or mitigate impact. For instance, if it is likely that a file transfer will be delayed due to current network conditions at a particular time and date, the system may generate a recommendation to wait to transfer the file until a later time when network conditions are expected to be improved (e.g., based on the one or more machine learning datasets 112*c*).

In another example, data from previous file transfers may be used to generate one or more machine learning datasets 112*c* linking file transfer sizes, computer resources involved in a file transfer, date information, time information, and the like, to one or more recommended efficiency modifications. For instance, one or more machine learning datasets may indicate that data associated with a file transfer of a first size is often associated with two additional file transfers of similar size. The machine learning datasets 112*c* may indicate that by transferring all three files together, in one transfer process, rather than in three separate transfer processes, fewer computing resources are required, the time associated with the transfer may be reduced and/or a cost associated with the transfer may be reduced. Accordingly, the system may identify a recommended modification to hold the first file requested for transfer and transfer the first file with the two subsequent requests when they are received.

The above examples are merely two examples of identifying a potential issue and/or efficiency modification. Various other example issues and/or efficiency modifications may be identified without departing from the invention.

The machine learning datasets 112*c* may be updated and/or validated based on the data associated with one or more content data streams received subsequent to, for instance, an initiate content data stream received and analyzed. For instance, as additional or subsequent data is received, the machine learning datasets 112*c* may be validated and/or updated based on the newly received information. Accordingly, the system may continuously refine determinations of a likelihood of an issue occurring, recommended efficiency modifications, and the like.

The machine learning datasets 112*c* may be used by, for example, a system modification module 112*d*. System modification module 112*d* may store instructions and/or data that may cause or enable the dynamic data transmission control computing platform 110 to generate an instruction or command associated with a recommended modification to avoid or mitigate impact of a likely issue and/or associated with a recommended efficiency modification. The system modification module 112*d* may generate the instruction or command, as well as an instruction or command to implement the recommended modification or efficiency modification. The system modification module 112*d* may transfer the instruction to a system (e.g., a system from which the content data being analyzed was received) to implement the identified modification.

For instance, if it is determined that waiting to transfer a file would avoid a file transfer delay or failure, the system modification module 112*d* may generate an instruction to hold the requested file and transfer a predetermined later time. That instruction may be transmitted to computer system 1 120, computer system 2 130, or the like, and may be executed by the computer system.

Dynamic data transmission control computing platform 110 may further include an interface generation/display module 112*e*. The interface generation/display module 112*e* may store instructions and/or data that may cause or enable the dynamic data transmission control computing platform 110 to generate one or more user interfaces, including notifications of potential issues, recommended modifications to avoid or mitigate identified potential issues, potential efficiency improvements, and the like. The interface generation/display module 112e may transmit one or more generated interfaces to a computing device, such as local user computing device 150, local user computing device 155, remote user computing device 170, remote user computing device 175, or the like, and may cause the interface to display on the computing device.

Dynamic data transmission control computing platform 110 may further include one or more databases 112f. The one or more databases 112f may store information related to previous events, user information, account information, and the like.

FIGS. 2A-2D depict an illustrative event sequence for implementing and using dynamic data transmission control functions in accordance with one or more aspects described herein. The events shown in the illustrative event sequence are merely one example sequence and additional events may be added, or events may be omitted, without departing from the invention.

Referring to FIG. 2A, at step 201, content data may be received from a computer system, such as computer system 1 120. The content data may include data associated with one or more events, such as file transfers, transactions, expected transactions, data storage, and the like.

In step 202, content data may be received from another computing system, such as computer system 2 130. The content data may include data associated with one or more events, such as file transfers, transactions, expected transactions, data storage, and the like. Although two computer systems are shown and described, more of fewer computer systems may provide data to the dynamic data transmission control computing platform without departing from the invention.

In step 203, the content data may be received by the dynamic data transmission control computing platform 110. In step 204, one or more event data analysis functions of the dynamic data transmission control computing platform 110 may be activated or initiated. For instance, receipt of one or more content data streams may enable or activate functionality associated with analyzing the received data to determine whether a potential issue is likely and/or to determine whether one or more efficiency modifications are recommended.

In step 205, data may be extracted from the received content data. For instance, data associated with one or more events may be extracted. In some examples, the extracted data may include data associated with a requested file transfer (e.g., type of file or data being transferred, size of file, date of transfer, time of transfer, and the like), a requested transaction or expected transaction (e.g., amount of transaction, account associated with transaction, date of transaction, time of transaction, and the like), requested data storage (e.g., type of data, content of data, target database, structure of target database, and the like), and the like.

With reference to FIG. 2B, in step 206, the extracted data may be compared to one or more machine learning datasets. For instance, data related to file transfers (e.g., size, date, time, resources involved, and the like), data storage (e.g., target database, data content, or the like), and/or transactions (e.g., amount, type, or the like) may be compared to one or more machine learning datasets.

In step 207, a likelihood of a potential issue and/or a recommended efficiency modification may be determined or identified based on the comparison of the extracted data to the one or more machine learning datasets. For instance, the extracted data may be compared to one or more machine learning datasets to determine a likelihood that a potential issue may arise. In some examples, if the likelihood is greater than a predetermined threshold, a suggested modification may be identified, based on the machine learning datasets, to avoid the issue or mitigate an impact of the issue, in step 208.

In another example, the extracted data may be compared to one or more machine learning datasets to determine whether one or more efficiency modifications should be implemented. If so, an appropriate efficiency modification may be identified based on the machine learning datasets, in step 208.

In step 209, the identified modification or efficiency modification may be transmitted to a computer system. For instance, the identified modification or efficiency modification may be transmitted to the computer system from which the extracted data analyzed to identify the modification was received. Accordingly, in step 210, the identified modification or efficiency modification may be transmitted to computer system 1 120. In some examples, the identified modification or efficiency modification may include a command or instruction to implement the modification or efficiency modification. For instance, the transmitted modification or efficiency modification may include an instruction or command causing the computer system 120 to modify a data structure, adjust data or file transfer times or requests, modify aspects of a transaction, or the like.

In step 210, the identified modification or efficiency modification may be executed by the computer system 120. In some examples, the identified modification or efficiency modification may be automatically executed by the computer system 120 upon receiving the instruction or command. In other examples, user input may be required before executing the instruction or command to execute the identified modification or efficiency modification. As discussed above, executing the modification or efficiency modification may include holding requested file transfers, modifying a data structure to accommodate storage of incoming data, modifying one or more characteristics of an account or transaction to avoid an issue or mitigate impact of an issue, and the like.

In some arrangements, the modification may be executed for temporarily (e.g., for the event for which data was extracted and analyzed, for only the event for which data was extracted and analyzed, or the like). For instance, if the system identifies an efficiency modification to hold a file transfer in anticipation of additional file transfers to improve efficiency, that modification to hold the file transfer may be performed for the requested file transfer. Each subsequent file transfer request may then be evaluated to determine whether efficiency modifications exist.

In other arrangements, the modification executed may be a permanent modification to the system (e.g., for the current event for which data was extracted and analyzed and future events). For instance, as data enters the system to be stored, if a conflict is identified in the structure of the data storage, the structure may be permanently modified in order to accommodate future data storage as well.

If a modification or efficiency modification is identified for another computer system, the identified modification or efficiency modification may be transmitted to the computer system. For instance, in step 211, a modification or efficiency modification may be transmitted to computer system 2 130. In some examples, the identified modification or efficiency modification may include a command or instruction to implement the modification or efficiency modification. For instance, the transmitted modification or efficiency modification may include an instruction or command causing the computer system 130 to modify a data structure, adjust data or file transfer times or requests, modify aspects of a transaction, or the like.

Figure 2C:
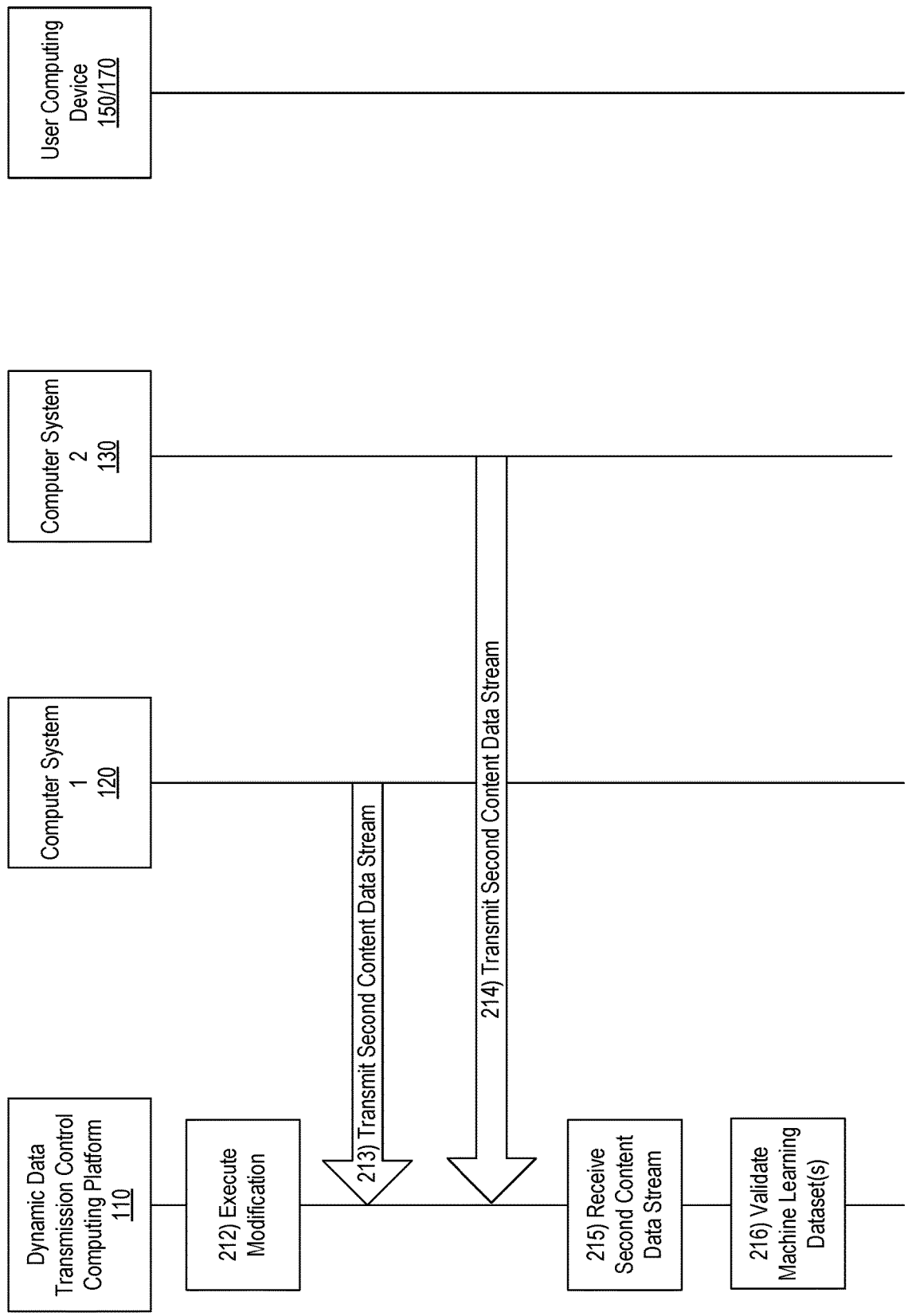

With reference to FIG. 2C, in step 212, the identified modification or efficiency modification may be executed by the computer system 130. In some examples, the identified modification or efficiency modification may be automatically executed by the computer system 130 upon receiving the instruction or command. In other examples, user input may be required before executing the instruction or command to execute the identified modification or efficiency modification. As discussed above, executing the modification or efficiency modification may include holding requested file transfers, modifying a data structure to accommodate storage of incoming data, modifying one or more characteristics of an account or transaction to avoid an issue or mitigate impact of an issue, and the like.

In steps 213 and 214, additional data may be transmitted from one or more computer systems 120, 130. For instance, in step 213, a second, subsequent content data stream may be transmitted to the dynamic data transmission control computing platform 110. In step 214, a second, subsequent content data stream may be transmitted from computer system 2 130 to the dynamic data transmission control computing platform 110.

In step 215, the second content data streams may be received by the dynamic data transmission control computing platform 110. In step 216, the received second content data streams may be used to validate and/or update the one or more machine learning datasets. For instance, the later received information from the one or more computer systems may be evaluated to update and/or validate the one or more machine learning datasets.

Figure 2D:
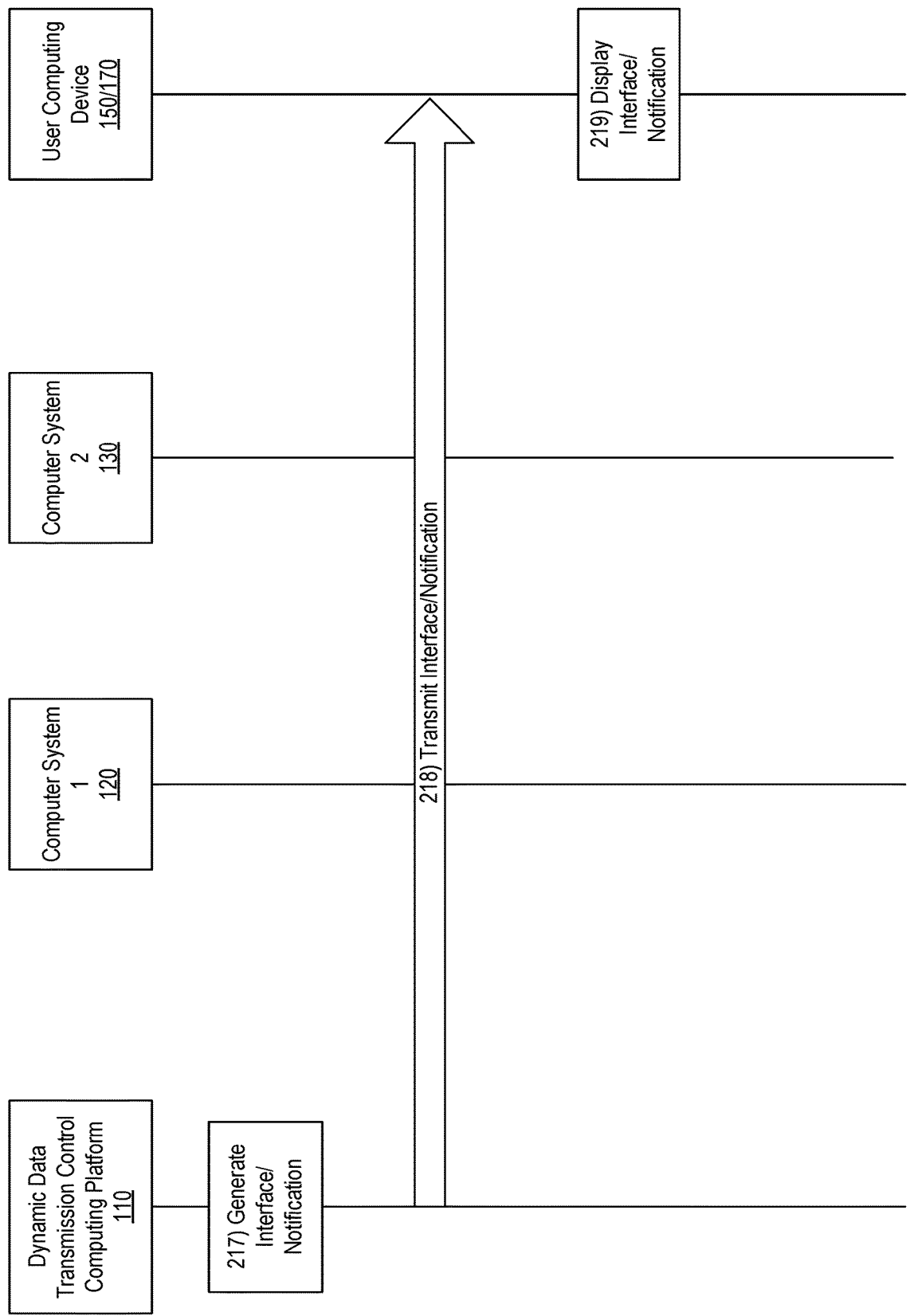

With reference to FIG. 2D, at step 217, one or more user interfaces including notifications may be generated. In some examples, the user interfaces may include notifications of proposed modifications or efficiency modifications. In some examples, the user interfaces may include notifications that one or more modifications or efficiency modifications have been implemented (e.g., automatically). In other examples, the user interfaces may include notifications requesting user input to implement a modification or efficiency improvement. Various other notifications and user interfaces may be generated without departing from the invention.

In step 218, the generated interface may be transmitted to a computing device, such as local user computing device 150, remote user computing device 170, or the like. In step 219, the generated interface may be displayed on the computing device. For instance, the dynamic data transmission control computing platform 110 may transmit an instruction or command to display the generated interface. Accordingly, the generated interface may be displayed on a display of the computing device 150, 170.

Figure 3:
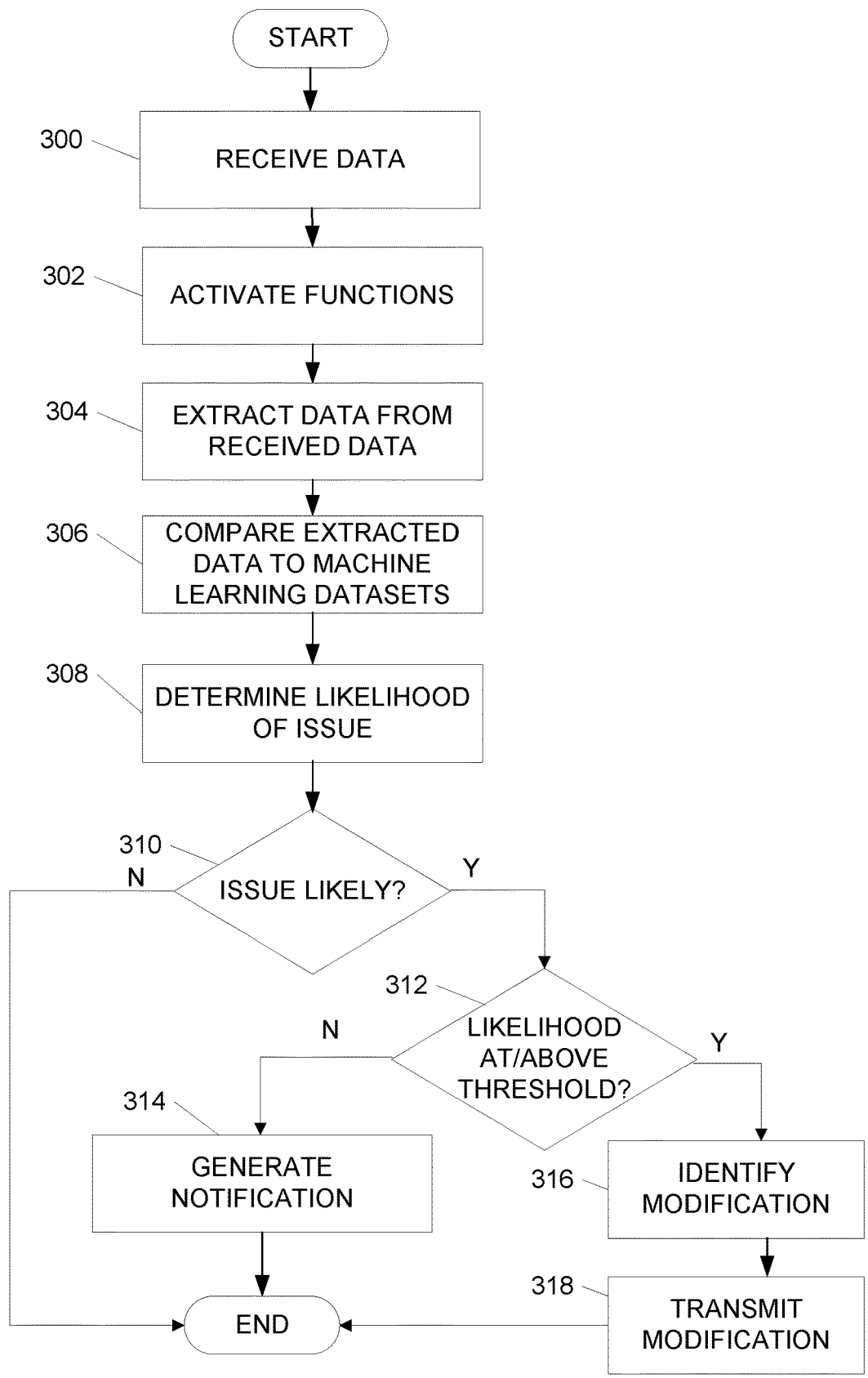
FIG. 3 depicts an illustrative method for implementing and using a system to perform dynamic data transmission control functions, according to one or more aspects described herein.

FIG. 3 is a flow chart illustrating one example method of implementing dynamic data transmission controls according to one or more aspects described herein. The processes illustrated in FIG. 3 are merely some example processes and functions. The steps shown may be performed in a different order, more steps may be added, or one or more steps may be omitted without departing from the invention.

In step 300, data may be received by the dynamic data transmission control computing platform 110. The data may be received as one or more content data streams from one or more computer systems. In step 302, one or more event data analysis functions may be activated or enabled. In some examples, activating the event data analysis functions may be activated or enabled in response to receiving the data.

In step 304, event data may be extracted from the received data. In some examples, event data may be data associated with events such as a data or file transfer request, transaction, data storage, and the like. As discussed herein, the extracted data may include time, date, transaction type, amount, type of file, content of data, file size, and the like.

In step 306, the extracted data may be compared to one or more machine learning datasets to determine a likelihood that an issue may occur, in step 308. In step 310, a determination may be made as to whether an issue or potential issue is likely. Some example issues or potential issues may include, for instance, file transfer delays or failures, incompatibility between data incoming for storage and a data structure, lack of funds to complete a transaction, higher than normal need for protection from exceeding account limits or amount of protection for exceeding account limits, and the like. If an issue or potential issue is not likely, the process may end. If an issue or potential issue is likely, a determination may be made, in step 312, as to whether the determined likelihood is at or above a predetermined threshold.

If the likelihood is not at or above the predetermined threshold, a notification may be generated in step 314. The notification may include an indication that an issue or a potential issue is likely. In some examples, one or more options to avoid the issue or mitigate impact may also be provided.

If, in step 312, the likelihood is at or above the predetermined threshold, one or more modifications to a computing device or system to avoid the issue and/or mitigate impact of the issue may be identified in step 316. In step 318, the identified modification may be transmitted to a computer system to be executed (e.g., in some examples, automatically executed).

Figure 4:
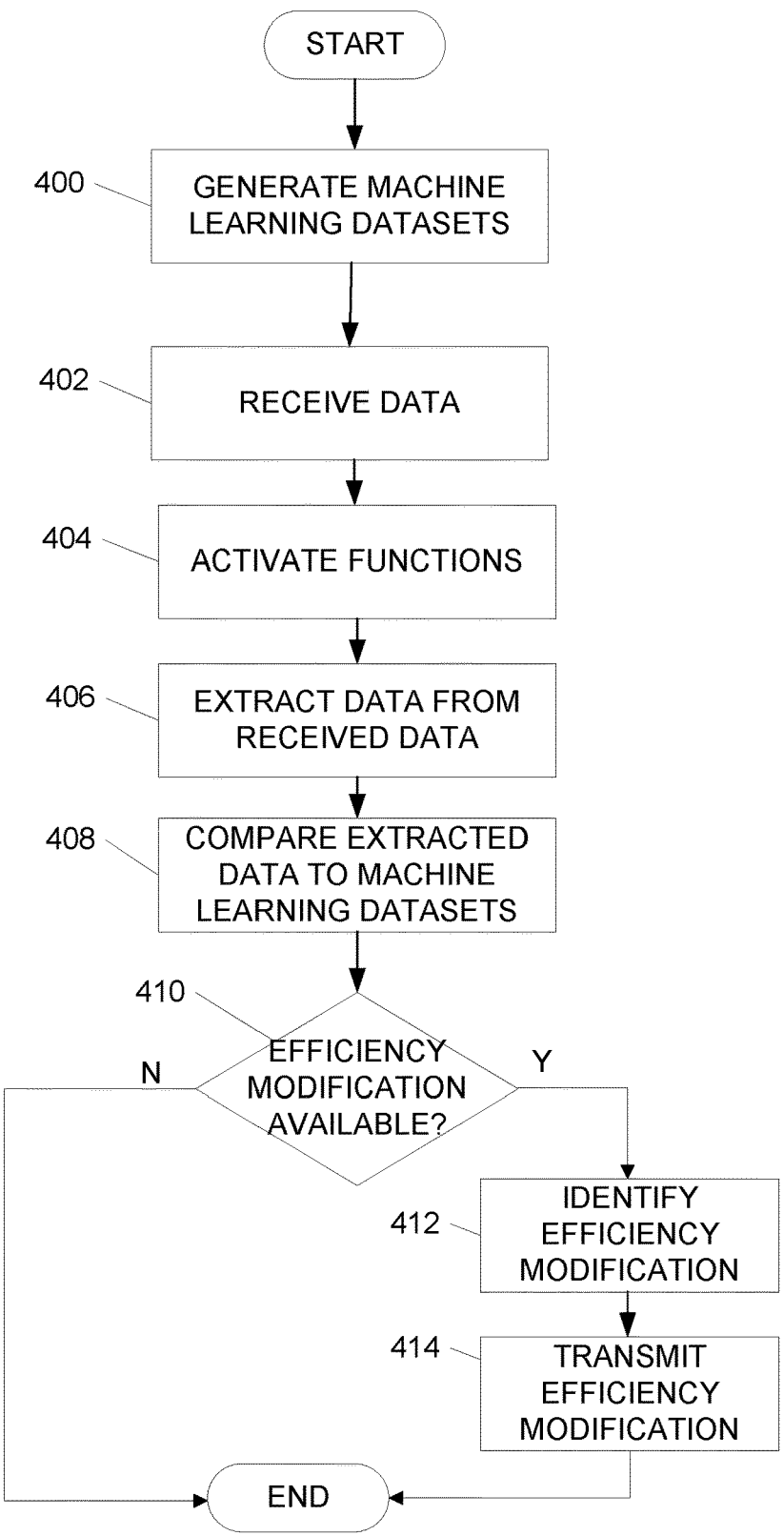
FIG. 4 depicts another illustrative method for implementing and using a system to perform dynamic data transmission control functions, according to one or more aspects described herein.

FIG. 4 is a flow chart illustrating another example method of implementing dynamic data transmission controls according to one or more aspects described herein. The processes illustrated in FIG. 4 are merely some example processes and functions. The steps shown may be performed in a different order, more steps may be added, or one or more steps may be omitted without departing from the invention.

In step 400, one or more machine learning datasets may be generated. As discussed herein, the machine learning datasets may be generated based on data from one or more computer systems, internal computing devices, external computing devices, and the like. In some examples, the machine learning datasets may be generated based on historical data associated with events such as file or data transfers, data storage, transactions, and the like, as well as historical data associated with one or more issues and the like.

In step 402, data may be received by the dynamic data transmission control computing platform 110. The data may be received as one or more content data streams from one or more computer systems. In step 404, one or more event data analysis functions may be activated or enabled. In some examples, activating the event data analysis functions may be activated or enabled in response to receiving the data.

In step 406, event data may be extracted from the received data. In some examples, event data may be data associated with events such as a data or file transfer request, transaction, data storage, and the like. As discussed herein, the extracted data may include time, date, transaction type, amount, type of file, content of data, file size, and the like.

In step 408, the extracted data may be compared to one or more machine learning datasets. In step 410, based on the comparison, a determination may be made as to whether one or more efficiency improvements or modifications are available for the event. For instance, based on the machine learning datasets, the system may determine whether one or more efficiency modifications are available, appropriate, or the like.

If, in step 410, efficiency modifications are not available, the process may end. If, in step 410, one or more efficiency modifications are available, one or more efficiency modifications to implement may be identified in step 412. The identified one or more efficiency modifications may be transmitted to a computer system to be implements (e.g., in some examples, automatically) in step 414.

Figure 5:
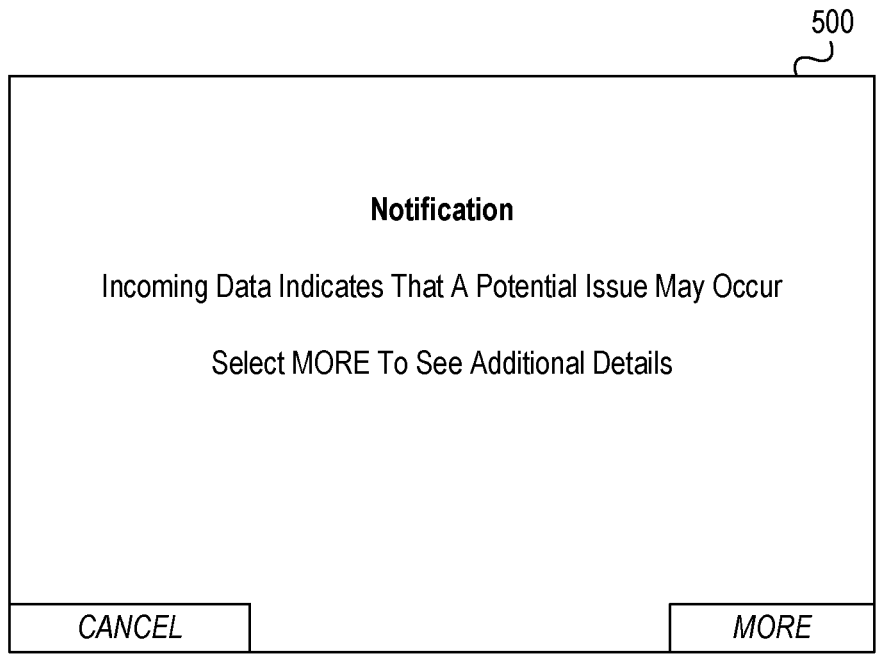
FIG. 5 illustrates one example user interface that may be generated, according to one or more aspects described herein.

FIG. 5 illustrates one example user interface that may be generated in accordance with one or more aspects described herein. The interface 500 may include an indication that an issue or potential issue is likely. However, because the likelihood of the issue is not at or above the threshold, the notification may include an option to provide additional details (e.g., systems impacted, event for which issue is likely, and the like). In some examples, the additional details may be provided in a separate interface that may be displayed upon selection of "MORE" option.

Figure 6:
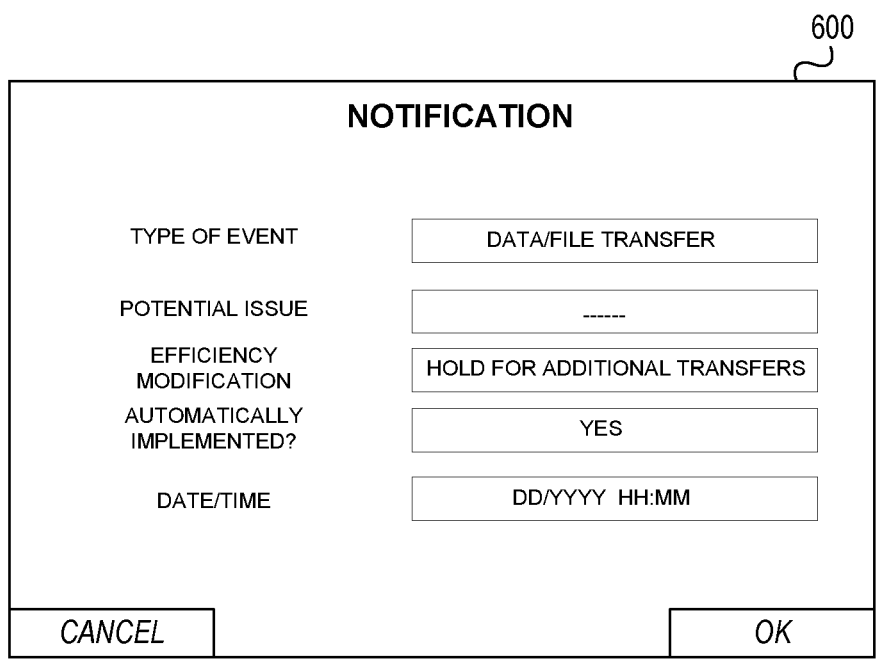
FIG. 6 illustrates another example user interface that may be generated, according to one or more aspects described herein.

FIG. 6 illustrates another example user interface that may be generated in accordance with one or more aspects described herein. The interface 600 may include a notification that a modification to avoid or mitigate a potential issue and/or an identified efficiency modification has been automatically implemented. The interface 600 may include fields indicating a type of event, resources impacted by the event, whether there is a potential issue or a type of potential issue, an identified efficiency modification, whether the modification was automatically implemented and/or a date and time at which the modification was automatically implemented. Various other data may be provided in the user interface without departing from the invention.

As discussed herein, the arrangements described provide for use of machine learning datasets to identify potential issues in a computer system, identify a modification to avoid the issue or mitigate impact, and/or execute modifications. As discussed herein, efficiency modifications may also be identified based on machine learning datasets and executed to enable more efficient use of computing resources in a system.

As discussed herein, in some examples, analysis of incoming data may be in-line data analysis such that the received data is analyzed in real-time or near real-time to enable identification of potential issues in advance of an issue occurring. Identifying potential issues quickly may be significant in attempting to avoid an issue or in mitigating risk associated with an issue. Further, implementing efficiency improvements and/or modifications may significantly reduce need for or use of computing resources, network resources, and the like.

Below are some example issues that may be identified, modifications to avoid the issue or mitigate impact, efficiency improvements or modifications, and the like. The below examples are merely some examples and various other issues, modifications and/or efficiency improvements may be used with or generated by the system without departing from the invention.

In some examples, the dynamic data transmission control functions may be used to more efficiently and accurately perform file or data transfers. For instance, as discussed above, one example efficiency modification may include identifying a data or file transfer that is often accompanied by additional data or file transfers. In some examples, a modification may be made to hold the initiate file transfer request in anticipation of the other, subsequent requests. In some examples, the file transfer may be held for a predetermined time period and, if subsequent requests do not arrive, the file or data may be released for transfer.

However, holding the initial request for file transfer may provide an efficiency improvement. For instance, in performing a single file transfer of the multiple files or data requests, resources associated with the transfer (e.g., source device, network bandwidth, target device, and the like) may be in use for less time than they would to, for instance, initiate and complete three separate transactions. In addition, if cost is associated with transmission of the file or data, costs associated with a single transfer may be less than those associated with multiple file transfers.

In some examples, the machine learning datasets may evaluate a source device of a requested file or data transfer, a target device of a data transfer, and the like, and may evaluate the source device and target device for accuracy. For instance, the machine learning datasets may be used to confirm that the file or data for transfer is intended to be transmitted to the identified target (e.g., by evaluating content of the data, historical transmission data, and the like). If an issue is identified, a notification may be generated and displayed to a user requesting confirmation of the identified target, identifying the possible intended target, and the like.

In some arrangements evaluating a source and/or target of a data or file transfer may also include evaluating users associated with the source and/or target devices. For instance, data associated with a user's job functions, business unit, and the like, may be used with data associated with content of the data transfer to confirm that the intended recipient should be receiving the file transfer. If not, a notification may be generated and displayed, transmission of the file or data may be prevented, and the like.

In some examples, the dynamic data transmission control functions may be used to evaluate performance of users based on data and/or files transferred between users. For instance, timing, content of data, and the like, may be used to evaluate users who are providing more work product than other users.

Data storage may also be impacted by use of the dynamic data transmission control functions described herein. In some examples, machine learning datasets may be used to identify segments of data that may be of particular interest to a user, group of users, or the like. The system may then provide only the data deemed to be of interest to the computing devices of the user, groups of users, or the like. For example, if a user is associated with billing for an entity, the entity may store data associated with clients or customers that might not be of interest to the billing user or might not be appropriate for the billing user to view or access. Accordingly, the one or more machine learning datasets may be used to identify data appropriate to the user and provide access to that data and, in some examples, provide access to only that data.

In some examples, the machine learning datasets may be used to identify potential issues with incoming data. For instance, if event data is received by a system that includes a certain number of items for processing in the event, and shortly thereafter additional event data is received including the same number of items for processing, the machine learning datasets may indicate that potential duplicate items have been received. Accordingly, a modification to not store the second incoming data and, instead, evaluate the second incoming data to determine whether it includes duplicate data may be performed. In some examples, the duplicate data may be automatically discarded (e.g., not stored, deleted, stored in a separate database, or the like).

In some arrangements, incoming data to a data repository may be evaluated by the system described herein to ensure compatibility with data storage structures in place. In examples in which data is received from multiple sources or feeds, incompatible data may be received. Accordingly, in some examples, a data structure or design may be modified to accommodate incoming data based on a potential issue identified via one or more machine learning datasets and incoming extracted data being evaluated.

Processing of events and management of accounts may also be improved or impacted by the dynamic data transmission control functions provided herein. For instance, machine learning may be used to develop an understanding or broad view of users, clients, vendors, and the like, to anticipate issues, modify accounts in anticipation of issues, and the like, to ensure the user, client, or the like, continues to provide expected business performance which is not interrupted by payment issues, billing issues, or the like.

For example, a particular client may pay all outstanding invoices at the same day and time each week. Accordingly, machine learning datasets may recognize this pattern of payment and may identify a potential issue of a shortfall of funds. Accordingly, the system may identify a modification, such as providing additional funds as needed to the client (or ensuring fulfillment of any payments made) to ensure payments are uninterrupted between the client and vendor. The system may then implement this modification in advance of the day and time at which payments are made each week. The modification may be permanent (e.g., additional funds may be available anytime) or may available for a predetermined time in advance of the day and time of payment and then the modification may be removed, reversed, or revised after a predetermined time has lapsed.

In another example, a client may have credit with an entity that may have a given limit. However, historical data may indicate that every six months additional credit is requested. Accordingly, the machine learning datasets may be used to evaluate data associated with the client, anticipate the request for additional credit and provide the increased credit (e.g., without a request from the client in some examples).

In still another example, a particular type of client may provide seasonal services to customers. Accordingly, historical data may indicate that purchases made by the client increase dramatically in a particular month. Accordingly, the dynamic data transmission functions may be used to anticipate the increase in purchases, modify one or more accounts, lines of credit, or the like, to ensure sufficient funds are available in advance, and the like.

In still other examples, aspects of the dynamic data transmission control functions provided herein may enable more granular and/or identification of use of services, resources, or the like, as well as costs associated with the services, resources, or the like. For instance, computing resources used in, for instance, data transfers, may be difficult to accurately allot to a particular user. Accordingly, machine learning may be used to identify patterns in data transfer requests, file sizes, transmission times, number of files, or the like, to determine a cost associated with the percentage of resources used, rather than a blended cost based on overall use of the resources for a particular time period.

As indicated above, various other example issues, modifications, efficiency modifications, and the like, may be identified and/or executed, without departing from the invention.

Figure 7:
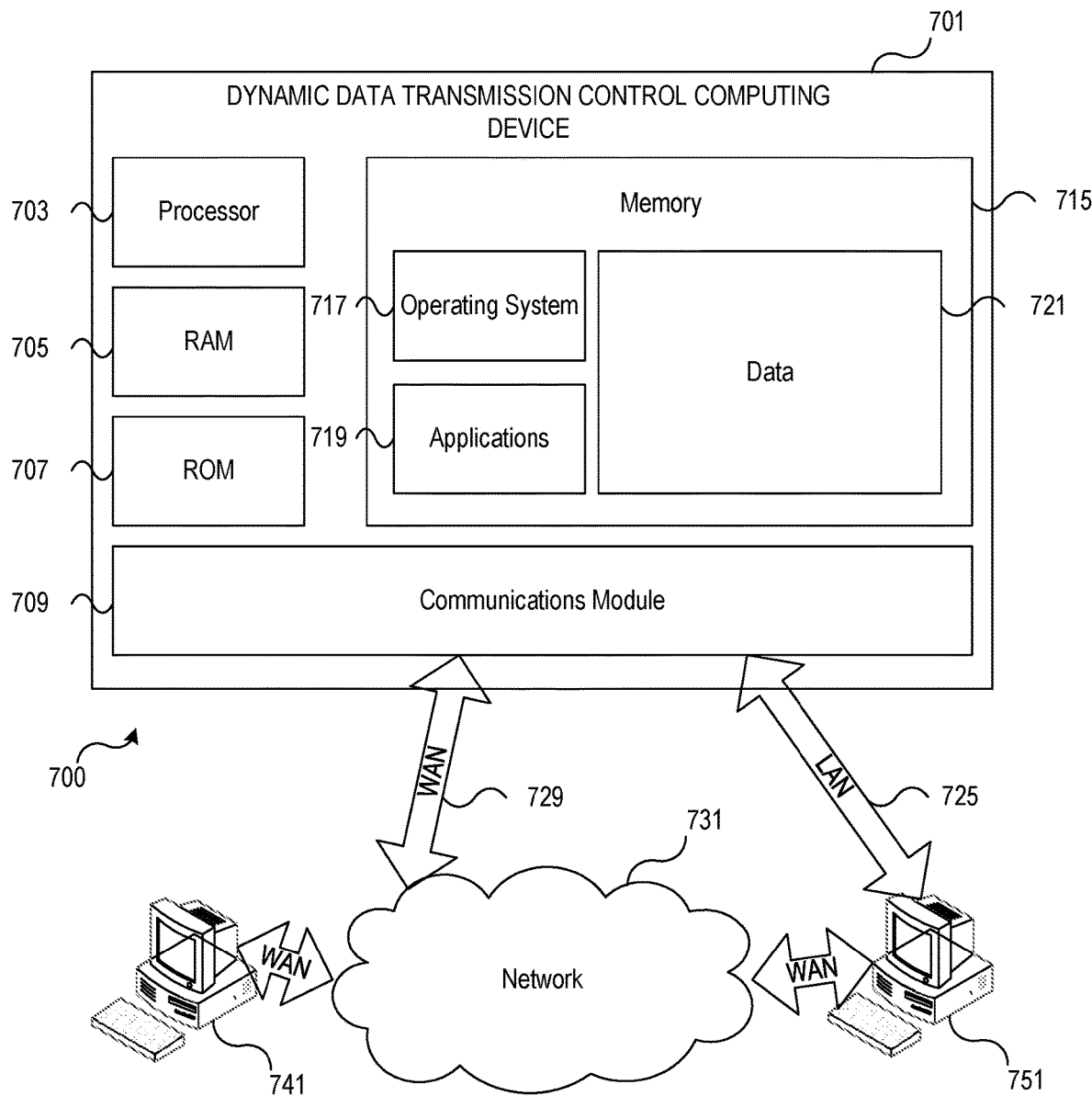
FIG. 7 illustrates one example operating environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include dynamic data transmission control computing device 701 having processor 703 for controlling overall operation of dynamic data transmission control computing device 701 and its associated components, including Random Access Memory (RAM) 705, Read-Only Memory (ROM) 707, communications module 709, and memory 715. Dynamic data transmission control computing device 701 may include a variety of computer readable media. Computer readable media may be any available media that may be accessed by dynamic data transmission control computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic data transmission control computing device 701. Such a processor may execute computer-executable instructions stored on a computer-readable medium.

Software may be stored within memory 715 and/or storage to provide instructions to processor 703 for enabling dynamic data transmission control computing device 701 to perform various functions. For example, memory 715 may store software used by dynamic data transmission control computing device 701, such as operating system 717, application programs 719, and associated database 721. Also, some or all of the computer executable instructions for dynamic data transmission control computing device 701 may be embodied in hardware or firmware. Although not shown, RAM 705 may include one or more applications representing the application data stored in RAM 705 while dynamic data transmission control computing device 701 is on and corresponding software applications (e.g., software tasks) are running on dynamic data transmission control computing device 701.

Communications module 709 may include a microphone, keypad, touch screen, and/or stylus through which a user of dynamic data transmission control computing device 701 may provide input, and may also include one or more of a speaker for providing audio output and a video display device for providing textual, audiovisual and/or graphical output. Computing system environment 700 may also include optical scanners (not shown). Exemplary usages include scanning and converting paper documents, e.g., correspondence, receipts, and the like, to digital files.

Dynamic data transmission control computing device 701 may operate in a networked environment supporting connections to one or more remote computing devices, such as computing devices 741 and 751. Computing devices 741 and 751 may be personal computing devices or servers that include any or all of the elements described above relative to dynamic data transmission control computing device 701.

The network connections depicted in FIG. 7 may include Local Area Network (LAN) 725 and Wide Area Network (WAN) 729, as well as other networks. When used in a LAN networking environment, dynamic data transmission control computing device 701 may be connected to LAN 725 through a network interface or adapter in communications module 709. When used in a WAN networking environment, dynamic data transmission control computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 8:
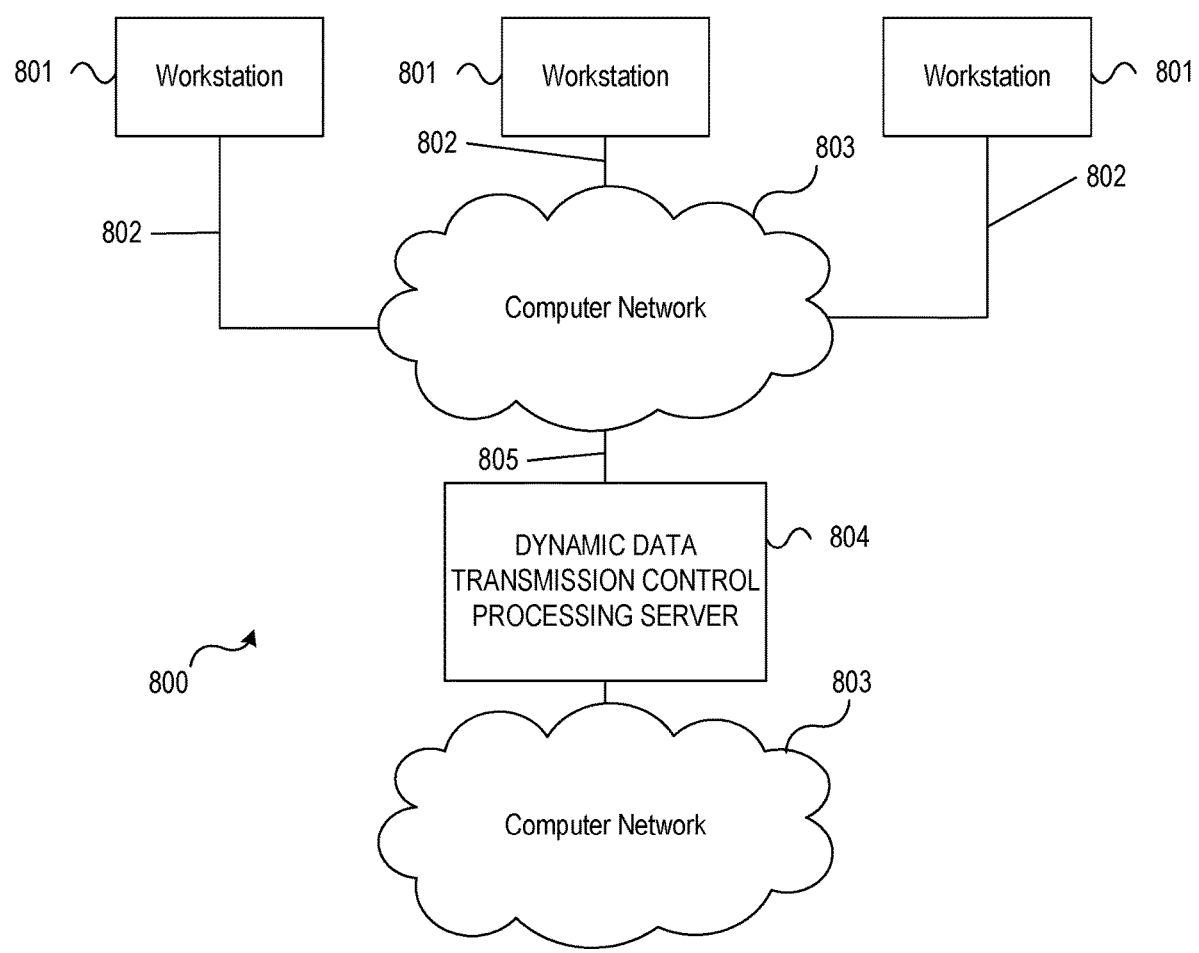
FIG. 8 depicts an illustrative block diagram of workstations and servers that may be used to implement the processes and functions of certain aspects of the present disclosure in accordance with one or more aspects described herein.

FIG. 8 depicts an illustrative block diagram of workstations and servers that may be used to implement the processes and functions of certain aspects of the present disclosure in accordance with one or more example embodiments. Referring to FIG. 8, illustrative system 800 may be used for implementing example embodiments according to the present disclosure. As illustrated, system 800 may include one or more workstation computers 801. Workstation 801 may be, for example, a desktop computer, a smartphone, a wireless device, a tablet computer, a laptop computer, and the like, configured to perform various processes described herein. Workstations 801 may be local or remote, and may be connected by one of communications links 802 to computer network 803 that is linked via communications link 805 to dynamic data transmission control server 804. In system 800, dynamic data transmission control server 804 may be a server, processor, computer, or data processing device, or combination of the same, configured to perform the functions and/or processes described herein. Server 804 may be used to receive data, extract data, determine a likelihood of an issue, identify a modification or efficiency modification, generate instructions to execute a modification or efficiency instruction, and the like.

Computer network 803 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 802 and 805 may be communications links suitable for communicating between workstations 801 and dynamic data transmission control server 804, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic data transmission control computing platform, comprising:
    at least one processor;
    a communication interface communicatively coupled to the at least one processor; and
    memory storing computer-readable instructions that, when executed by the at least one processor, cause the dynamic data transmission control computing platform to:
        receive a plurality of content data streams from a plurality of computing devices;
        extract, from a first content data stream of the plurality of content data streams, data associated with an event, the event including a request to transfer a first file of a first size;
        responsive to extracting the data, determine, in real-time and based on one or more machine learning datasets, a likelihood that a potential issue associated with the event will occur and an efficiency modification, the efficiency modification including holding the request to transfer the first file of the first size until additional files of the first size are requested for transfer;
        identify, based on the likelihood that a potential issue associated with the event will occur and the efficiency modification, a modification to execute on a first computing device from which the extracted data was received, the modification including an instruction to hold the transfer of the first file until the additional files of the first size are requested for transfer;
        transmit the identified modification to the first computing device; and
        execute the identified modification to the first computing device.

2. The dynamic data transmission control computing platform of claim 1, wherein executing the identified modification includes modifying the first computing device for the event.

3. The dynamic data transmission control computing platform of claim 1, wherein executing the identified modification includes modifying the first computing device permanently.

4. The dynamic data transmission control computing platform of claim 1, wherein the one or more machine learning datasets are generated based on received data from the plurality of computing devices, internal data, and external data.

5. The dynamic data transmission control computing platform of claim 1, further including instructions that, when executed, cause the dynamic data transmission control computing platform to:
    determine whether the likelihood that the potential issue associated with the event will occur is at or above a predetermined threshold; and
    responsive to determining that the likelihood that the potential issue associated with the event will occur is at or above the predetermined threshold, identifying the modification to execute on the first computing device.

6. The dynamic data transmission control and computing platform of claim 1,
    wherein the efficiency modification includes holding the request to transfer the first file of the first size until one of: additional files of the first size are requested for transfer or a predetermined time period has expired,
    wherein the modification includes the instruction to hold the transfer of the first file until one of: the additional files of the first size are requested for transfer or the predetermined time period has expired;
    the dynamic data transmission control and computing platform further including instructions that, when executed, cause the dynamic data transmission control and computing platform to:
    determine whether one of: the request to transfer additional files of the first size is received or the predetermined time period has expired;
    responsive to determining that the request to transfer additional files of the first size is received, automatically executing the request to transfer the first file and the request to transfer the additional files of the first size; and
    responsive to determining that the predetermined time period has expired, automatically transferring the first file.

7. A method, comprising:
    at a computing platform comprising at least one processor, memory, and a communication interface:
        receiving, by the at least one processor and via the communication interface, a plurality of content data streams from a plurality of computing devices;
        extracting, by the at least one processor and from a first content data stream of the plurality of content data streams, data associated with an event, the event including a request to transfer a first file of a first size;
        responsive to extracting the data, determining, in real-time and by the at least one processor and based on one or more machine learning datasets, a likelihood that a potential issue associated with the event will occur and an efficiency modification, the efficiency modification including holding the request to transfer the first file of the first size until additional files of the first size are requested for transfer;

identifying, by the at least one processor and based on the likelihood that a potential issue associated with the event will occur and the efficiency modification, a modification to execute on a first computing device from which the extracted data was received, the modification including an instruction to hold the transfer of the first file until the additional files of the first size are requested for transfer;

transmitting, by the at least one processor, the identified modification to the first computing device; and executing, by the at least one processor, the identified modification to the first computing device.

8. The method of claim 7, wherein executing the identified modification includes modifying the first computing device for the event.

9. The method of claim 7, wherein executing the identified modification includes modifying the first computing device permanently.

10. The method of claim 7, wherein the one or more machine learning datasets are generated based on received data from the plurality of computing devices, internal data, and external data.

11. The method of claim 7, further including:

determining, by the at least one processor, whether the likelihood that the potential issue associated with the event will occur is at or above a predetermined threshold; and responsive to determining that the likelihood that the potential issue associated with the event will occur is at or above the predetermined threshold, identifying, by the at least one processor, the modification to execute on the first computing device.

12. One or more non-transitory computer-readable media storing instructions that, when executed by a computing platform comprising at least one processor, memory, and a communication interface, cause the computing platform to:

receive a plurality of content data streams from a plurality of computing devices;

extract, from a first content data stream of the received plurality of content data streams, data associated with an event, the event including a request to transfer a first file of a first size;

responsive to extracting the data, determine, based on one or more machine learning datasets, a likelihood that a potential issue associated with the event will occur and an efficiency modification, the efficiency modification including holding the request to transfer the first file of the first size until additional files of the first size are requested for transfer;

identify, based on the likelihood that a potential issue associated with the event will occur and the efficiency modification, a modification to execute on a first computing device from which the extracted data was received, the modification including an instruction to hold the transfer of the first file until the additional files of the first size are requested for transfer;

transmit the identified modification to the first computing device; and execute the identified modification to the first computing device.

13. The one or more non-transitory computer-readable media of claim 12, wherein executing the identified modification includes modifying the first computing device for the event.

14. The one or more non-transitory computer-readable media of claim 12, wherein executing the identified modification includes modifying the first computing device permanently.

15. The one or more non-transitory computer-readable media of claim 12, wherein the one or more machine learning datasets are generated based on received data from the plurality of computing devices, internal data, and external data.

16. The one or more non-transitory computer-readable media of claim 12, further including instructions that, when executed, cause the computing platform to:

determine whether the likelihood that the potential issue associated with the event will occur is at or above a predetermined threshold; and responsive to determining that the likelihood that the potential issue associated with the event will occur is at or above the predetermined threshold, identify the modification to execute on the first computing device.

* * * * *

UNITED STATES PATENT AND TRADEMARK OFFICE
CERTIFICATE OF CORRECTION

PATENT NO. : 10,783,052 B2
APPLICATION NO. : 15/679514
DATED : September 22, 2020
INVENTOR(S) : Kurian et al.

Page 1 of 1

It is certified that error appears in the above-identified patent and that said Letters Patent is hereby corrected as shown below:

On the Title Page

Column 1, (73) Assignee, Line 2:
Delete "Charolotte" and insert --Charlotte,--

Signed and Sealed this
Fourth Day of May, 2021

Drew Hirshfeld
*Performing the Functions and Duties of the
Under Secretary of Commerce for Intellectual Property and
Director of the United States Patent and Trademark Office*